(12) United States Patent
Gupta et al.

(10) Patent No.: US 8,291,025 B2
(45) Date of Patent: Oct. 16, 2012

(54) CONTROLLING RETENTION OF PUBLICATION

(75) Inventors: Rahul Gupta, Bangalore (IN); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/604,864

(22) Filed: Oct. 23, 2009

(65) Prior Publication Data

US 2011/0099232 A1   Apr. 28, 2011

(51) Int. Cl.
  *G06F 15/16* (2006.01)
  *G06F 7/00* (2006.01)
  *G06F 3/00* (2006.01)
(52) U.S. Cl. .......... 709/206; 707/689; 719/313
(58) Field of Classification Search ........ 709/206; 707/689; 719/313
  See application file for complete search history.

(56) References Cited

U.S. PATENT DOCUMENTS

| | | |
|---|---|---|
| 2002/0194347 A1 | 12/2002 | Koo et al. |
| 2004/0128619 A1 | 7/2004 | McCall |
| 2006/0200700 A1 | 9/2006 | Malcolm |
| 2007/0174565 A1 | 7/2007 | Merrick et al. |
| 2008/0133337 A1 | 6/2008 | Fletcher et al. |

FOREIGN PATENT DOCUMENTS

WO   WO 2007/134885 A1   11/2007

OTHER PUBLICATIONS

Bohm, Declarative Development of Distributed Applications, Proceedings of SIGMOD2007, Jun. 10, 2007, pp. 75-76, Beijing, China.
Berghel, "Value-Added Publishing", Communications of the ACM, vol. 42, No. 1, Jan. 1999, pp. 19-23.

*Primary Examiner* — Ranodhi Serrao
(74) *Attorney, Agent, or Firm* — Marcia L. Doubet (57) ABSTRACT

A method of controlling the retention of publications in a publish/subscribe system, the method comprising receiving, at a message broker, a first publication from a publisher on a topic; receiving, at the message broker, a second publication from the publisher on the topic; identifying, at the message broker, whether the first publication should be overwritten with the second publication and, if not, retaining at least payload data from both the first and second publications on the topic; and storing, for the second publication, if retained, data indicating when the second publication was published to the broker. Other methods, apparatus, and computer readable media are also provided.

9 Claims, 4 Drawing Sheets

CONTROLLING RETENTION OF PUBLICATION

BACKGROUND

Within a messaging network, messages may be delivered from one data processing system to another via one or more "message brokers" that provide routing and, in many cases, transformations and other services. U.S. patent application Ser. No. 11/944,711 filed Nov. 26, 2007 by Fletcher et al. (Publication No. 2008/0133337 A1), incorporated herein by reference, describes such message brokers as well as publish/subscribe systems. The Fletcher et al. patent application discloses that, for managing the retention of publications in a publish/subscribe system, a publisher sends a new publication to a publish/subscribe broker with an indication of whether the new publication should be retained in association with a previous retained publication. If so, the contents or 'payload' of the new published message may be appended to a previous retained message, resulting in a single retained message that contains information from multiple published messages.

SUMMARY

Various embodiments provide a method of controlling the retention of publications in a publish/subscribe system. The method includes receiving, at a message broker, a first publication from a publisher on a topic. The method further includes receiving, at the message broker, a second publication from the publisher on the topic. The method further includes identifying, at the message broker, whether the first publication should be overwritten with the second publication and, if not, retaining at least payload data from both the first and second publications on the topic. The method further includes storing, for the second publication, if retained, history data indicating when the second publication was published to the broker in a common message with the payload data for the second publication.

Some embodiments provide a message broker for use in a publish/subscribe communications network. The broker includes a subscription matching component configured to compare received publications with stored subscriptions to identify matching publications and to identify subscribers to which matching publications should be forwarded. The broker includes a retention manager is configured to determine if a new publication received from a publisher on the same topic as a previous publication should overwrite the previous publication and, if not configured to store a the new publication as a history messaging including payload information from the publisher along with timestamp information. The broker includes a subscriber module capable of receiving and responding to any of a request from a subscriber to send only the most recent publication on a topic, as indicated by the timestamp information, to a request to send all publications on the topic, and to a request to send a subset of publications on a topic.

DETAILED DESCRIPTION

Various embodiments enable new published messages to be retained together with previous retained publications at a publish/subscribe broker, under the control of indications from the publisher. This enables sets of publications that have cumulative significance to be retained together, as an alternative to retaining all publications or retaining only one publication on each topic, so that a new subscriber can obtain from the broker the latest set of retained publications that have cumulative significance.

Figure 1:
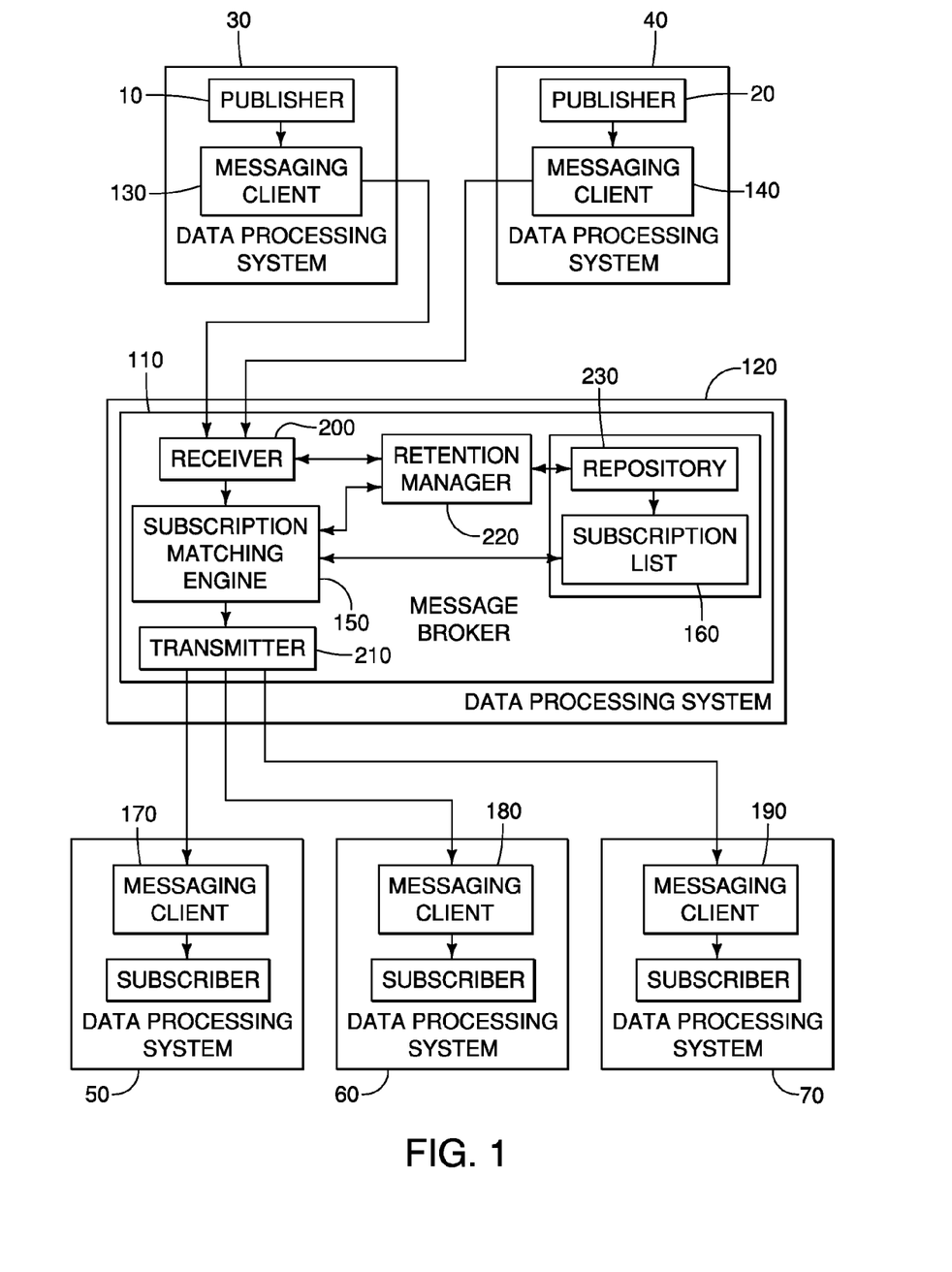
FIG. 1 is a block diagram of an exemplary embodiment of a publish/subscribe data processing network or system.

FIG. 1 shows a publish/subscribe messaging network in accordance with various embodiments. A set of publisher applications 10, 20 run on respective data processing systems 30, 40. The publisher applications are able to publish messages that can be received by multiple subscriber applications 50, 60, 70 that run on respective data processing systems 80, 90, 100. The publishers 10, 20 send messages to a publish/subscribe message broker 110 that is typically running on another data processing system 120. The subscribers specify to the broker which message types (using, for example, message topic names) they wish to receive. The message broker compares received publications with subscription information for the set of subscribers 50, 60, 70. For example, the message broker compares a topic name within the header of a received message with topic names on a subscription list or table that is associated with the broker, to identify any matches. The publishers do not need direct connections with subscribers. Publishers and subscribers do not need each other's address information. Instead, the publishers 10, 20 send messages to the broker 110, including message type information such as a message topic. Subscribers specify their requirements in subscription information that they send to the broker. The broker passes received messages on to subscribers that are interested in receiving messages of the received type.

In the embodiment shown in FIG. 1, the publishers 10, 20 and subscribers 50, 60, 70 rely on message transfer functions of underlying messaging clients 130, 140, 170, 180, 190 to handle message routing and formatting operations that take account of the complexities of a typical heterogeneous distributed network, as well as to provide an asynchronous message processing capability using message queues. In other embodiments, the message transfer functions of the messaging clients may instead be implemented as integral features of the publisher applications.

The message broker 110 comprises a subscription matching engine 150 and an associated subscription list, table, or database 160 associated with or in the broker's data processing system 120. In some embodiments, the message broker interfaces with a local messaging system (such as, for example, an IBM WebSphere MQ messaging product) that interoperates with the remote messaging clients 130, 140, 170, 180, 190 via network communications. However, in the illustrated embodiment, the message routing and formatting features of the broker's data processing system 120 are implemented as integral features of the broker 110 itself. In particular, the message broker 110 includes receiver and transmitter components 200, 210. The receiver and transmitter components 200, 210 include, for respective messaging clients, a communications stack and a protocol handling module for marshalling and demarshalling of the message broker's internal representations of a message to and from, for example, a canonical byte format, to allow messages to flow over the network connections. In the illustrated embodiment, a communications stack is configured for communication with an external network. For example, in some embodiments where TCP/IP is used, a communications stack has access to a TCP/IP socket for communication with the external network. In these embodiments, the message broker 110 listens on a particular TCP port for newly established client connections. On receipt of an inbound connection request, the message broker bootstraps a communications stack for that client. This stack is responsible for maintaining the connection with the client and monitoring the current state of the socket connection. The communications stack bootstraps the protocol handling module, and the protocol handling module handles the decoding and encoding of the message formats and communication protocol in order to achieve an internal object representation that can be consumed by the message broker. For example, in some embodiments, the protocol module will demarshal inbound messages from a publisher client into an object form and submit them to the subscription matching engine 150 for matching with registered subscriptions and for delivery to subscribers.

In the illustrated embodiment, the matching engine 150 compares a received publication with the set of currently registered subscriptions to identify zero, or one or more matches. In the illustrated embodiment, this involves topic matching. If the subscriber applications 50, 60, 70 are currently registered with the broker and are identified as SUBSCRIBER1, SUBSCRIBER2 and SUBSCRIBER3 respectively, for example, a subscription list held at the broker may be as follows:
SUBSCRIBER1: TOPIC1, TOPIC3
SUBSCRIBER2: TOPIC2, TOPIC4
SUBSCRIBER3: TOPIC1

In some embodiments, each topic is represented in an hierarchical character string format corresponding to an hierarchical topic tree used by the subscription matching engine 150. For example, TOPIC1 may be of the format "root/level1topicName/level2topicName", so that the matching engine can step through the hierarchy to check for matching subscriptions, as described earlier. Subject to any message filtering that is additional to topic matching, all messages on TOPIC1 that are received by the broker will be forwarded to SUBSCRIBER1 and SUBSCRIBER3. Messages received on TOPIC2 will be forwarded to SUBSCRIBER2 only; messages on TOPIC3 will be forwarded to SUBSCRIBER1 only; and messages on TOPIC4 will be forwarded to SUBSCRIBER2 only. These labels are examples only, different names can be used to identify these subscribers.

For the embodiment of FIG. 1, let us assume that all of the subscribers have non-durable subscriptions and so no messages are held at the broker on a per-subscriber basis for currently disconnected subscribers. Assume also that there is no high-capacity replay server. In other words, each publication is forwarded to the current set of registered subscribers that have subscribed to receive publications on the particular message topic specified within the published message, but in this particular embodiment there is no saving of messages on behalf of durable subscribers that are currently disconnected.

However, although publications are not saved on a per-subscriber basis, the present invention does provide support for retained publications, as described below.

An example messaging API that is used by known publisher applications includes a sendMessage operation that sends a message to the broker in response to a publisher specifying a topic name, specifying or attaching message data, and optionally setting a "retain" flag. The topic name is one of a set of predefined topic names, where each topic name in the set is interpretable by the message broker 110 and may be specified as a topic of interest by one or more subscribers. When specified by the publisher, the topic name and retain flag are included in a header of the sent message. The message data is also included in the message. The setting of the "retain" flag by the publisher is an instruction to the broker to copy this message into a message repository at the broker, and to retain the copy in the repository while this message is the latest-received message on the particular topic. The format of the sendMessage API call may be:
sendMessage(TOPIC_NAME, DATA, RETAIN_FLAG)
where TOPIC_NAME may be an hierarchical character string identifying one of the predefined topics, DATA is the data contents of the message, and RETAIN_FLAG is a value representing logical 'true' (i.e. the message should be retained at the broker) or 'false' (the message should not be retained). For example, a message may be published by issuing an API call such as:
sendMessage("greenhouse/temperature", "34 degrees", true)
where the topic is "greenhouse/temperature", the message data is a small data item "34 degrees", and the retain flag value is set to "true".

The broker will retain a copy of the message data "34 degrees" under topic "greenhouse/temperature" until a message is received on that topic that has a different data value (for example "32 degrees"). The new data value will then overwrite the previous value.

In various embodiments, a message that has the retain flag set to "true" does not necessarily overwrite an existing retained message.

In the illustrated embodiment, the retain feature is implemented by a retention manager 220 that is a component of the message broker 110. The retention manager receives a copy of the message data of each message received on any topic if the retain flag has been set to "true." Messages that do not have this flag set to "true" are not passed to the retention manager. Of course, the retain flag may be implemented using values 1 and 0 to represent "true" and "false", or using any other expression that has the effect of indicating whether the publisher requires messages to be retained or not.

Figure 2:
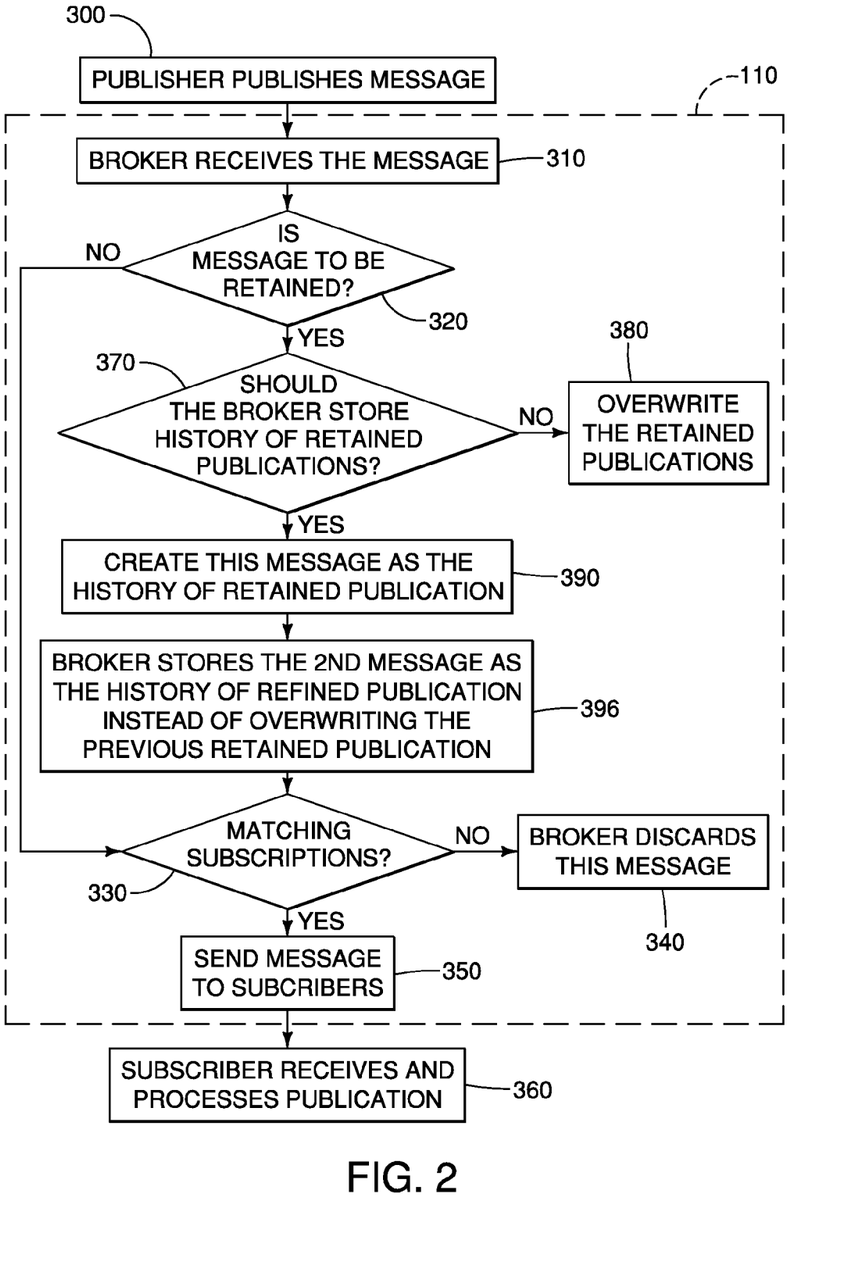
FIG. 2 is a flowchart of steps carried out by an exemplary embodiment of a publish/subscribe data processing network or system which includes a message broker.

FIG. 2 provides an illustration of a sequence of processing within the message broker 110 according to a first example embodiment. This processing sequence is only one possible implementation, and additional examples are possible. A publisher 10 (see FIG. 1) publishes or sends 300 a message to the broker 110 (see FIG. 1), including a retain flag which can take a value of true or false. The published message is processed 310 by the receiver-side communication stack and protocol handler 200, and then the retain flag is checked 320 to determine whether the publisher intended the message to be retained at the broker. If the retain flag is set to false, the message is passed to the subscription matching engine 150 (see FIG. 1). The subscription matching engine 150 compares 330 the topic information within the message header with subscriptions from the subscription list 160 (see FIG. 1) that were previously stored by the broker 110 to identify any matching subscriptions. If there is no topic match (or if other filter conditions are not satisfied), the message is deleted 340. A positive match between one or more subscriptions and the published message results in the message being forwarded 350 to one or more identified subscriber application(s) 50, 60, 70 (see FIG. 1). The subscriber application(s) then receive 360 and process the message in whatever way is specified by their own application logic.

However, if the retain flag is determined 320 to be set to true, the message is passed to the retention manager 220.

In 370, a determination is made as to whether the broker should store the history of retained publications for this message. If not, the retained publications are overwritten in 380. If so, in 390 the message received in 310 is created as the history of retained publications in the illustrated embodiment. In 396, the broker stores the second message (the message created in 390) as the history of retained publication instead of overwriting the previous retained publication (in the illustrated embodiment). In some embodiments, if the history of retained publications is maintained at the broker, the broker will store each retained publication on the same topic, along with time of publication details, as a different message. More particularly, in some embodiments, the payload of each retained publication on the same topic is stored as a additional history message.

Figure 3:
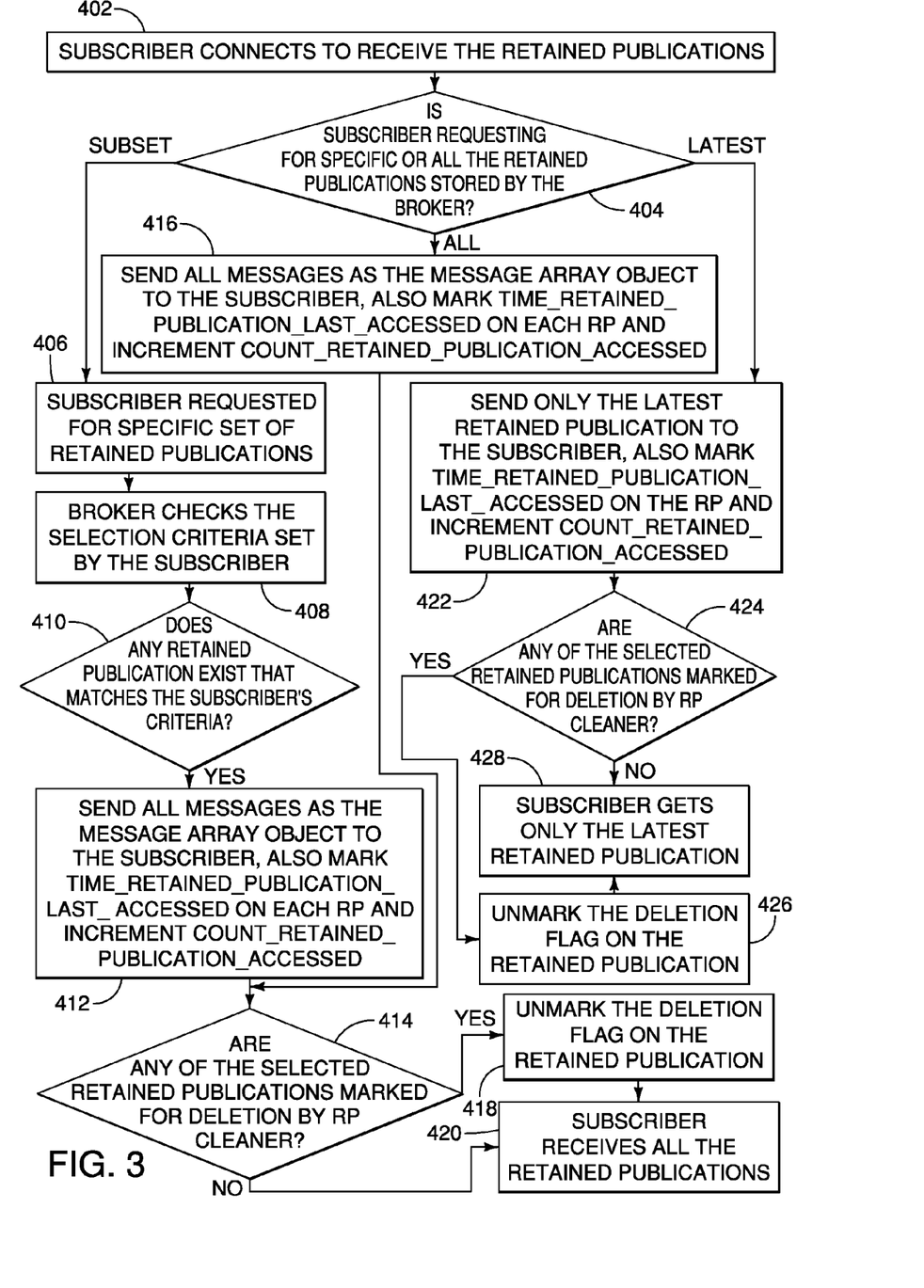
FIG. 3 is a flowchart of steps carried out by an exemplary embodiment of a publish/subscribe data processing network or system which includes a subscriber application.

FIG. 3 shows processing carried out by an exemplary embodiment of a subscriber application.

In 402, a subscriber connects to a subscriber application to receive retained publications. In 404, a determination is made as to whether 1) the subscriber is requesting a specific publication or all publications stored by the broker for a particular message; 2) the subscriber is requesting all retained publications (a complete history); or 3) the subscriber only wants the latest retained publication. If the subscriber is requesting only a subset, the subscriber proceeds to 406. In 408, the broker, in communication with the subscriber application, checks the selection criteria set by the subscriber. An example of selection criteria is: fetch all priority 1 retained publications/fetch all retained publications with StockPrice>100/fetch all retained publications published after October 1.

In 410, a determination is made as to whether any retained publication exists that matches all of the subscriber's criteria. If not, no publication is sent to the subscriber. If so, in 412, matching messages are sent to the subscriber, e.g., as message array objects. In addition, in the illustrated embodiment, an attribute indicative of the time the publication was last accessed is marked in 412 with the access time on each accessed retained publication. In FIG. 3, this attribute is named Time_Retained_Publication_Last_Accessed. Further, in 412, an attribute indicating the number of times a retained publication was accessed is incremented. In FIG. 3, this attribute is named Count_Retained_Publication_Accessed. When specific names of attributes are provided herein, it should be apparent that any desired attribute name can, of course, be employed. After 412, the process proceeds to 414.

If, in 402, a determination was made that the subscriber is requesting all retained publications, the process proceeds to 416. In 416, all messages are sent to the subscriber, e.g., as a message array object. In addition, in the illustrated embodiment, the attribute Time_Retained_Publication_Last_Accessed indicative of the time the publication was last accessed is marked in 416 with the access time on each accessed retained publication. Further, in 416, the attribute Count_Retained_Publication_Accessed indicating the number of times a retained publication was accessed is incremented. After 416, the process proceeds to 414.

In 414, a determination is made as to whether any of the selected retained publications is marked for deletion by a cleaning utility. If so, in 418, a deletion flag is unmarked for retained publications (a flag is set with a value indicating that the retained publications can be deleted). In 420, the subscriber receives all the requested retained publications.

If, in 402, a determination was made that the subscriber is requesting only the latest retained publication, the process proceeds to 422. In 422, only the latest retained publication is sent to the subscriber, e.g., as a message array object. In addition, in the illustrated embodiment, the attribute Time_Retained_Publication_Last_Accessed indicative of the time the publication was last accessed is marked in 422 with the access time for the latest retained publication. Further, in 422, the attribute Count_Retained_Publication_Accessed indicating the number of times a retained publication was accessed is incremented for the latest retained publication. After 422, the process proceeds to 424.

In 424, a determination is made as to whether any of the selected retained publications are marked for deletion by a cleaning utility. If so, in 426, a deletion flag is unmarked for retained publications. In 428, the subscriber receives only the latest retained publication.

Using the exemplary embodiment described above in connection with FIG. 3, subscribers can request retained publications from broker. As shown in FIG. 3, subscribers can request retained publications in three different ways: a) A subscriber can request only a subset of retained publication on the same topic; b) a subscriber can request all retained publications published on the same topic; or c) a subscriber can request only the latest retained publication on that topic.

Various embodiments provide the ability for the broker to delete the unwanted retained publications that are not of significance to the subscribers. This gives the broker the ability to clear off the not so important retained publications.

The following are examples of some new attributes (or flags or variables) that are employed, in various embodiments, to help the broker to determine which retained publications are un-important so they can be discarded. While descriptive names are used herein, to better enable one of ordinary skill in the art to understand their purposes, other names could, of course, be used.

1) Minimum_Retained_Publications_To_Store=<Integer> (minimum value is at least 1).

2) Force_Maximum_Retained_Publications_To_Store=<integer>

3) MAX_Threshold_Clean=<integer>

4) RP_Cleaner=<milli-seconds>

5) Minimum_Retained_Publications_To_Store

This attribute determines the minimum number of retained publications the broker must store. Minimum value is 1 indicating at any given point of time there will be at least one retained publication stored.

6) Force_Maximum_Retained_Publications_To_Store

This attribute determines the maximum number of retained publications to store. After this value has been exceeded, the broker will then start over-writing new publications over the un-wanted subscriptions. Alternatively, if all the subscriptions are important, the broker will then will start over-writing from the oldest retained publication stored. When this attribute is set to a non-zero value, that indicates that the broker will forcefully overwrite the retained publications.

7) MAX_Threshold_Clean

This attribute is used by the a cleaner process, routine or thread, herein referred to as RP_Cleaner, to determine if it should start removing the old retained publications.

8) RP_Cleaner

This attribute determines the duration after which the RP-Cleaner thread should run to clean the unwanted retained publications.

The following are implementation details on how the broker determines if a retained publication is unwanted or insignificant so that the RP_Cleaner thread can remove the retained publications, in some embodiments.

Whenever a retained publication is published by the broker, the broker stores the "time" when the message was stored, the time when the message was last accessed by the subscribers, and sets an internal counter to 1, as follows:
Time_Retained_Publication_Published_Original=dd/mm/yy hh:mm:ss:<milliseconds>
Time_Retained_Publication_Last_Accessed=dd/mm/yy hh:mm:ss:<milliseconds>
Count_Retained_Publication_Accessed=<incremental integer value>

Consider the following scenario about the Currency value changing in the global market over a period of time. 1 Dollar=40 Rupees.

Initially, the publisher first publishes a retained publication as "1 Dollar=40 Rupees." The broker internally stores the message as follows:
Data=1 Dollar=40 Rupees
Time_Retained_Publication_Published_Original=01/10/08 11:01:45:345
Time_Retained_Publication_Last_Accessed=01/10/08 11:01:45:345
Count_Retained_Publication_Accessed=1

Due to the fluctuating market conditions the rupee versus dollar exchange rate changes, and the publisher publishes different retained publications as follows
1 Dollar=39 Rupees
1 Dollar=42 Rupees
1 Dollar=39.40 Rupees
1 Dollar=43 Rupees Hence after 5 updates, broker will have stored 5 different retained publications as follows:
Original Message 1:
Data=1 Dollar=40 Rupees
Time_Retained_Publication_Published_Original=01/10/08 11:01:45:345
Time_Retained_Publication_Last_Accessed=01/10/08 11:01:45:345
Count Retained Publication Accessed=1
History Message 1:
Data=1 Dollar=39 Rupees
Time_Retained_Publication_Published Original=01/10/08 12:01:45:345
Time_Retained_Publication_Last_Accessed=01/10/08 12:01:45:345
Count_Retained_Publication_Accessed=1
History Message 2:
Data=1 Dollar=42 Rupees
Time_Retained_Publication_Published_Original=01/10/08 13:01:45:345
Time_Retained_Publication_Last_Accessed=01/10/08 13:01:45:345
Count_Retained_Publication_Accessed=1
History Message 3:
Data=1 Dollar=39.40 Rupees
Time_Retained_Publication_Published_Original=02/10/08 08:01:45:345
Time_Retained_Publication_Last_Accessed=02/10/08 08:01:45:345
Count_Retained_Publication_Accessed=1
History Message 4:
Data=1 Dollar=43 Rupees
Time_Retained_Publication_Published_Original=02/10/08 10:01:45:345
Time_Retained_Publication_Last_Accessed=02/10/08 10:01:45:345
Count_Retained_Publication_Accessed=1

In various embodiments, every time a subscriber requests any of the retained publications, the broker will keep on updating the following two attributes for every retained publication referred by the subscribers:
Time_Retained_Publication_Last_Accessed
Count_Retained_Publication_Accessed In various embodiments, when the RP_Cleaner thread runs, depending on the RP_Cleaner and MAX_Threshold_Clean values set, the RP_Cleaner thread determines which retained publications are to be marked for deletion. When the RP_Cleaner thread first determines the message can be discarded, it just marks the message to be deleted. If any subscriber connects before the next run of the RP_Cleaner thread and still accesses this marked-for-delete message, the broker makes that retained publication again available for the subscribers. This gives better control of the retained publications.

Figure 4:
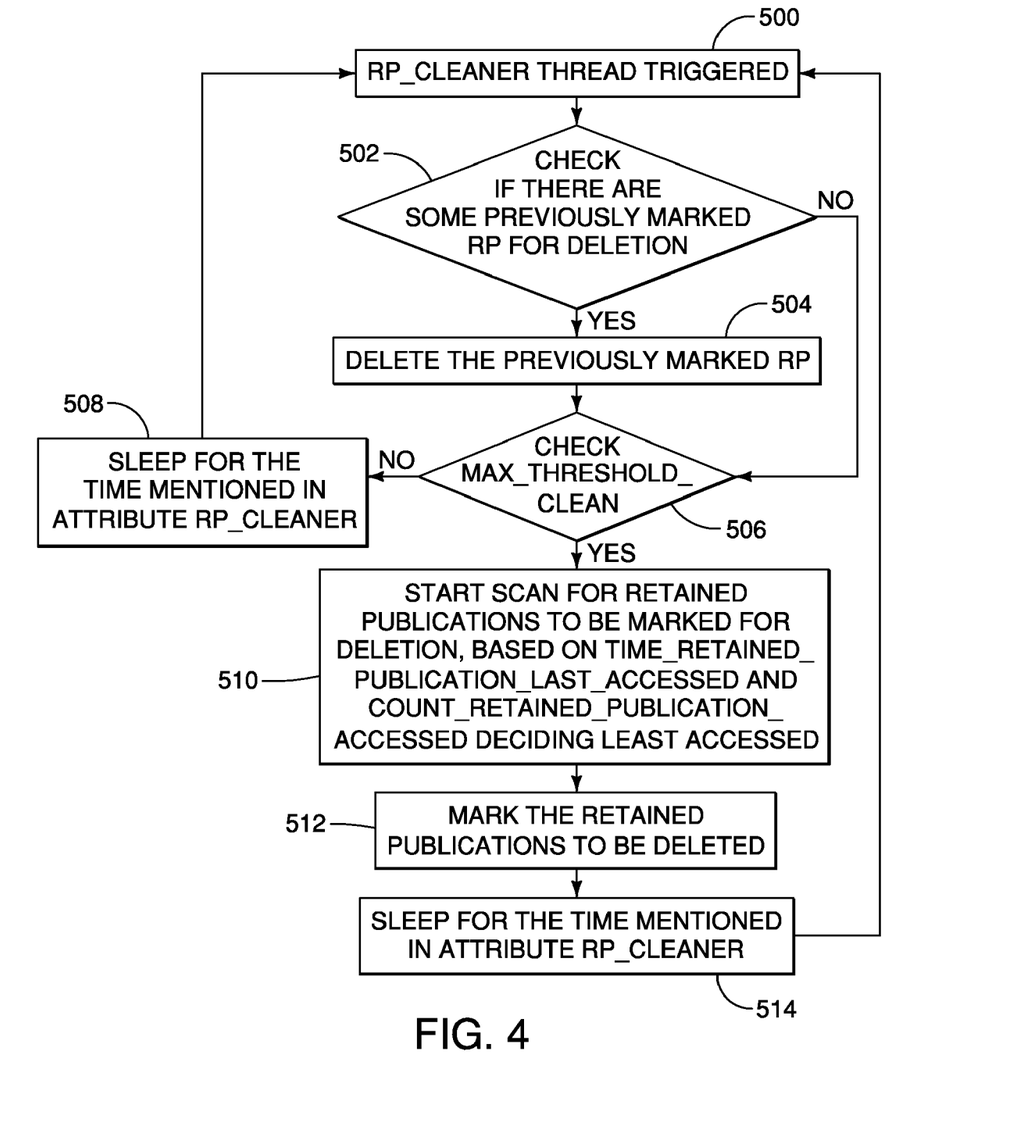
FIG. 4 is a flowchart of steps carried out by an exemplary embodiment of a cleaning utility for removing unwanted retained publications, in a publish/subscribe data processing network or system.

FIG. 4 illustrates an exemplary embodiment of a cleaning approach (RP_Cleaner). In 500, the cleaner is triggered. In 502, a determination is made as to whether there are some retained publications previously marked for deletion. If so, in 504, the retained publications previously marked for deletion are deleted. If not, the process proceeds to 506.

In 506, MAX_Threshold_Clean determines if the RP_Cleaner thread should start scanning for retained publications to be marked for deletion. If not, the process proceeds to 508. In 508, the process sleeps for a specified amount of time. More particularly, in the illustrated embodiment, the RP_Cleaner thread runs after the amount of time specified in the RP_Cleaner attribute.

If, in 506, it was determined to start scanning, then in 510, scanning occurs for retained publications to be marked for deletion. The retained publication cleaner will consider the time the retained publication was last accessed (Time_Retained_Publication_Last_Accessed attribute) as well as how many times the retained publication was accessed (Count_Retained_Publication_Accessed attribute) to determine which of the retained publications are least accessed by the subscribers. For example, it is possible that the second publication for a topic is most accessed and last publication is least accessed. So the cleaner will mark the last publication for deletion instead of the second message. This makes the broker intelligent enough to determine which of the retained publications should be removed based on the importance and usage of the retained publications by the subscribers.

After 510, the process proceeds to 512. In 512, the retained publication is marked to be deleted. After 512, the process proceeds to 514. In 514, the process sleeps for a specified amount of time. More particularly, in the illustrated embodiment, the RP_Cleaner thread runs after the amount of time specified in the RP_Cleaner attribute.

In some embodiments, a subscriber will have at least three options to fetch the retained publications. A first option is for a subscriber to request only a subset of retained publications on a given topic (e.g. fetch all retained messages with priority 1, or fetch all retained messages published after the 1st of October). In this scenario, in some embodiments, the broker will send the subset of the retained messages to the subscriber in the reverse order in which the broker received the retained publications (LIFO—Last In First Out method).

A second option is for a subscriber to request all retained publications published on a given topic. In this scenario, in some embodiments, the broker will send all the retained messages to the subscribers in the reverse order in which the broker received the retained publication (LIFO—Last In First Out method)

A third option is for a subscriber to request only the latest retained publication on that topic. In this scenario, when the subscriber requests the latest retained publication, the broker will return the last published message on the topic but not the first published message. In some embodiments, subscribers will get the last published message (LIFO) followed by the list of other history messages in the reverse order of their arrival.

Thus, various embodiments have been disclosed that provide enhanced event-based management of subscription matching in a publish/subscribe communications environment. A system and method has been provided where subscribers do not have to get one large chunk of appended messages. Instead, subscribers can get a sub-set of messages. The message broker can make decisions, based on user requirements, as to which of the history messages can be deleted. A subscriber can fetch a subset of messages directly without the application having to delimit the messages. No custom code is needed to fetch any part of the data. The broker will have flexibility to delete a sub-set of messages.

Note that use of durable subscriptions may not provide a useful solution. Even though it may seem that a durable subscription would get all the messages when it reconnects and also get those messages that would have published when the subscriber was not available, after the durable subscriber consumes the available messages these messages are destructively fetched. So the next time, if the same durable subscriber comes back, there is no way the subscriber will get back the old messages, it will only get new messages that were published. If the durable subscriber wants the old messages, there is no way they can get them. Another drawback is that if there is a new subscriber that registers after the messages were published, this subscriber will never know about the existence of the older messages.

Several elements of the disclosure, including the publish/subscribe broker, publisher applications, the publish/subscribe matching engine, and the subscriber applications are implemented in computer program code in some embodiments. This code may be written in an object oriented programming language such as C.sup.++, Java.TM. or SmallTalk or in a procedural programming language such as the C programming language. Some features and aspects of the disclosure may execute entirely on a single data processing device or may be distributed across a plurality of data processing systems within a data processing network such as a Local Area Network (LAN), a Wide Area Network (WAN), or the Internet. The connections between different systems and devices within such a network may be wired or wireless and are not limited to any particular communication protocols or data formats and the data processing systems in such a network may be heterogeneous systems.

In some embodiments, a publish/subscribe broker will be implemented on a high capacity, high performance, network-connected data processing system—since such systems can maintain high performance publication throughput for a large number of publishers and subscribers. In some embodiments, the publish/subscribe broker is a component of an edge server (i.e. the broker may be one of a set of Web server or application server components) or a network gateway device. However, 'micro broker' solutions that have a small code footprint have been developed in recent years and have been used for example in remote telemetry applications. Therefore, the publishers, subscribers and publish/subscribe broker may all be implemented on any one of a wide range of data processing systems and devices. Various aspects can therefore be implemented in networks that include wirelessly-connected PDAs and automated sensor devices as well as networks that include complex and high performance computer systems.

Further, various components of a distributed publish/subscribe communications network as disclosed above could be implemented either in software or in hardware (e.g. using electronic logic circuits). For example, in some embodiments, a publish/subscribe matching engine is implemented by a hardware comparator that compares a topic name within a published message with a topic name within a stored subscription. The comparator's output signal indicating a match or lack of a match is then processed within an electronic circuit to control whether or not a message is forwarded to a particular subscriber. In some embodiments, a filtering step implemented by some publish/subscribe matching engines is implemented by an electronic filter (a type of electronic circuit).

Embodiments of the invention can take the form of entirely hardware elements, entirely software elements or an combination containing both hardware and software elements. In a preferred embodiment, embodiments of the invention are implemented as software elements, which include but are not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description set out above describes particular embodiments only and is not intended to limit the invention, whose scope is determined solely by the claims set out below. As used here, singular forms "a", "an" and "the" are intended to include plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In compliance with the patent statutes, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

What is claimed is:

1. A method of controlling the retention of publications in a publish/subscribe system, the method comprising:
    receiving, at a message broker, a first publication from a publisher on a topic, wherein the message broker includes a processor;
    receiving, at the message broker, a second publication from the publisher on the topic;
    identifying, at the message broker, whether the first publication should be overwritten with the second publication and, if not, retaining at least payload data from both the first and second publications on the topic;
    storing, for the second publication, if retained, history data indicating when the second publication was published to the broker in a common message with the payload data for the second publication;
    storing, using the message broker, data indicating when the first publication was last accessed by a subscriber, data indicating when the second publication was last accessed by a subscriber, data indicating the number of times the first publication was accessed by a subscriber, and data indicating the number of times the second publication was accessed by a subscriber; and
    selectively removing a publication in response to at least one of number of times accessed and time when last accessed.

2. The method in accordance with claim 1 and further comprising overwriting, using the message broker, the first publication with the second publication if the identifying indicates that the first publication should be overwritten with the second publication.

3. The method in accordance with claim 1 and further comprising receiving, at the message broker, a more recent publication from the publisher on the topic, and accepting and responding to requests, using the message broker, from a subscriber for only the most recent publication on the topic, for all publications on the topic, or for a specific subset of publications on the topic.

4. A system controlling the retention of publications in a publish/subscribe system, the system comprising:
    a computer comprising a processor; and
    instructions which are executable, using the processor, to perform functions comprising:
        receiving, at a message broker, a first publication from a publisher on a topic;
        receiving, at the message broker, a second publication from the publisher on the topic;
        identifying, at the message broker, whether the first publication should be overwritten with the second publication and, if not, retaining at least payload data from both the first and second publications on the topic;
        storing, for the second publication, if retained, history data indicating when the second publication was published to the broker in a common message with the payload data for the second publication;
        storing, using the message broker, data indicating when the first publication was last accessed by a subscriber, data indicating when the second publication was last accessed by a subscriber, data indicating the number of times the first publication was accessed by a subscriber, and data indicating the number of times the second publication was accessed by a subscriber; and
        selectively removing a publication in response to at least one of number of times accessed and time when last accessed.

5. The system in accordance with claim 4, wherein the functions further comprise overwriting, using the message broker, the first publication with the second publication if the identifying indicates that the first publication should be overwritten with the second publication.

6. The system in accordance with claim 4, wherein the functions further comprise receiving, at the message broker, a more recent publication from the publisher on the topic, and accepting and responding to requests, using the message broker, from a subscriber for only the most recent publication on the topic, for all publications on the topic, or for a specific subset of publications on the topic.

7. A computer program product comprising a non-transitory computer usable storage medium having a computer readable program embodied therein, wherein the computer readable program, when executed on a computer, causes the computer to:
    receive, at a message broker, a first publication from a publisher on a topic;
    receive, at the message broker, a second publication from the publisher on the topic;
    identify, at the message broker, whether the first publication should be overwritten with the second publication and, if not, retaining at least payload data from both the first and second publications on the topic;
    store, for the second publication, if retained, history data indicating when the second publication was published to the broker in a common message with the payload data for the second publication;
    store, using the message broker, data indicating when the first publication was last accessed by a subscriber, data indicating when the second publication was last accessed by a subscriber, data indicating the number of times the first publication was accessed by a subscriber, and data indicating the number of times the second publication was accessed by a subscriber; and
    selectively remove a publication in response to at least one of number of times accessed and time when last accessed.

8. The computer program product in accordance with claim 7, wherein the computer readable program further causes the computer to overwrite, using the message broker, the first publication with the second publication if the identifying indicates that the first publication should be overwritten with the second publication.

9. The computer program product in accordance with claim 7, wherein the computer readable program further causes the computer to receive, at the message broker, a more recent publication from the publisher on the topic, and accepting and responding to requests, using the message broker, from a subscriber for only the most recent publication on the topic, for all publications on the topic, or for a specific subset of publications on the topic.

* * * * *